INVENTOR
R.A. KAENEL
BY Lucian C. Canepa
ATTORNEY

PRIOR ART

INVENTOR
R.A. KAENEL
BY Lucian C. Canepa
ATTORNEY

INVENTOR
R.A. KAENEL
BY Lucian C. Canepa
ATTORNEY

Dec. 31, 1963 R. A. KAENEL 3,116,424

BIPOLAR BISTABLE SELECTIVE REGENERATIVE AMPLIFIER

Filed May 11, 1960 4 Sheets-Sheet 4

INVENTOR
R.A. KAENEL
BY Lucian C. Canepa
ATTORNEY

United States Patent Office 3,116,424
Patented Dec. 31, 1963

3,116,424

BIPOLAR BISTABLE SELECTIVE REGENERATIVE AMPLIFIER

Reginald A. Kaenel, Murray Hill, N.J., assignor to Bell Telephone Laboratories, Incorporated, New York, N.Y., a corporation of New York Filed May 11, 1960, Ser. No. 28,343
11 Claims. (Cl. 307—88.5)

This invention relates to signal translating circuits, and more particularly to bipolar bistable selective regenerative amplifying circuits employing negative resistance diodes.

Circuits which operate in a monostable mode to supply regenerative gain to trigger pulses are well known. The time duration or width of the amplified output pulses of such circuits may be exactly controlled, thereby making the circuits well suited for performing gating and timing functions. Typically, such known circuits are unipolar, i.e., they are capable of providing amplified output pulses of a predetermined width only in response to input trigger pulses of one selected polarity.

The concept of selectively gating input trigger pulses to such circuits is also known. In accordance with this concept, an input trigger pulse of the selected polarity is first applied to a gating circuit and then passed or not passed to an associated monostable circuit depending respectively on whether the gating circuit is in an unblocked or blocked condition during the time in which the trigger pulse is applied thereto.

An object of the present invention is the improvement of signal translating circuits.

More specifically, an object of this invention is the provision of a unitary circuit arrangement capable of both selecting and regeneratively amplifying input trigger pulses.

Another object of the present invention is the provision of bipolar bistable selective regenerative amplifying circuits, i.e., circuits which in one condition are capable of providing amplified output pulses of a predetermined width only in response to positive trigger pulses, and which in the other condition are capable of providing amplified output pulses of a predetermined width only in response to negative trigger pulses.

A further object of this invention is the provision of bipolar bistable selective regenerative amplifying circuits which are characterized by high speed, low power dissipation, high reliability, and simplicity of design.

These and other objects of the present invention are realized in a specific illustrative embodiment thereof which includes a bistable configuration having a center leg or path in which an inductor is connected. When the bistable configuration is in one of its two stable conditions, current flows through the inductor in one direction; when the bistable configuration is in the other of its two stable conditions, current flows through the inductor in the other direction. A control pulse source is connected to the bistable configuration for switching the configuration back and forth between its two stable conditions, thereby selectively controlling the direction of current flow through the inductor.

Connected in series with the inductor in the center leg of the bistable configuration are two series-opposed negative resistance diodes of the voltage-controlled type. Thus, when the bistable configuration is in one of its two stable conditions, current flows through one of the diodes in a forward direction and through the other diode in a reverse direction. Conversely, when the bistable configuration is in the other one of its two stable conditions, current flows through the one diode in a reverse direction and through the other diode in a forward direction.

Connected in parallel with the series-opposed negative resistance diodes are a bipolar signal pulse source and an output path including a utilization device.

The application to the series-opposed diodes of a relatively small positive current pulse from the bipolar signal source, when the bistable configuration is in the first of its two stable conditions, causes the forward current-conducting or first diode to switch from its quiescent point on a selected one of the positive resistance regions of its characteristic curve to a higher voltage point on another positive resistance region of its characteristic curve, a switching and charging action due to the inductor then causing the first diode to revert back to its quiescent point. During the time in which the first diode is undergoing a cycle of operation that involves being switched from its quiescent or relatively low voltage point to its relatively high voltage point and then switching and charging back to its quiescent point, the positive current pulse causes the condition of the second diode to describe a path about its quiescent point on the reverse current portion of its characteristic curve. The voltage excursion of the second or unswitched diode is less than that of the first or switched diode. As a result, a relatively large net positive voltage of a predetermined width appears across the series-opposed diodes, and, therefore, across the utilization device, in response to a positive trigger pulse.

The application to the series-opposed diodes of a relatively small negative current pulse from the bipolar signal source, when the bistable configuration is in the first of its two stable conditions, simply causes the forward current-conducting or first diode to shift from its quiescent point on the selected one of the positive resistance regions of its characteristic curve to a lower voltage point on the selected positive resistance region, and, at the same time, causes the reverse current-conducting or second diode to shift from its quiescent point on the reverse current portion of its characteristic curve to a lower voltage point on the reverse current portion, both diodes returning to their quiescent points at the termination of the nagative current pulse. The voltage excursions of the two diodes in this case are approximately the same and exceedingly small. Accordingly, the voltage across the series-opposed diodes, and, therefore, across the utilization device, does not change appreciably in response to a negative trigger pulse.

The application to the series-opposed diodes of a relatively small negative current pulse from the bipolar signal source, when the bistable configuration is in the second of its two stable conditions, causes the forward current-conducting or second diode to switch from its quiescent point on a selected one of the positive resistance regions of its characteristic curve to a lower voltage point on another positive resistance region of its characteristic curve, a switching and charging action due to the inductor then causing the second diode to revert back to its quiescent point. During the time in which the second diode is undergoing a cycle of operation that involves being switched from its quiescent or relatively high voltage point to its relatively low voltage point and then switching and charging back to its quiescent point, the negative current pulse causes the condition of the first diode to describe a path about its quiescent point on the reverse current portion of its characteristic curve. The voltage excursion of the second or switched diode is greater than that of the first or unswitched diode. As a result, a relatively large net negative voltage of a predetermined width appears across the series-opposed diodes, and, therefore, across the utilization device, in response to a negative trigger pulse.

The application to the series-opposed diodes of a relatively small positive current pulse from the bipolar signal source, when the bistable configuration is in the second of its two stable conditions, simply causes the forward current-conducting or second diode to shift from its quiescent point on the selected one of the positive resistance regions of its characteristic curve to a higher voltage point on the selected positive resistance region, and, at the same time, causes the first diode to shift from its quiescent point on the reverse current portion of its characteristic curve to a higher voltage point on the reverse current portion, both diodes returning to their quiescent points at the termination of the positive current pulse. The voltage excursions of the two diodes are in this case approximately the same and exceedingly small. Accordingly, the voltage across the series-opposed diodes, and, therefore, across the utilization device, does not change appreciably in response to a positive trigger pulse.

Thus, a bipolar bistable selective regenerative amplifying circuit made in accordance with the principles of the present invention selectively responds in one condition only to positive signal pulses to provide amplified positive output pulses of a predetermined width, and in the other condition selectively responds only to negative signal pulses to provide amplified negative output pulses of a predetermined width.

It is a feature of the present invention that a bipolar bistable selective regenerative amplifying circuit include a first and a second bistable configuration, the condition of the first bistable configuration priming the second bistable configuration to selectively respond to either positive or negative signal pulses.

It is another feature of this invention that a bipolar bistable selective regenerative amplifying circuit include an inductor which is common to both bistable configurations of the circuit.

It is still another feature of this invention that a bipolar bistable selective regenerative amplifying circuit include a first and a second bistable configuration, the second bistable configuration comprising series-opposed negative resistance diodes the direction of current flow through which is dependent upon the condition of the first bistable configuration.

It is yet another feature of the present invention that a bipolar bistable selective regenerative amplifying circuit include a first and a second bistable configuration, the second bistable configuration comprising series-opposed negative resistance diodes the direction of current flow through which is dependent upon the condition of the first bistable configuration, a bipolar input signal source and an output path each connected in parallel with the series-opposed diodes, and a pulse source connected to the first bistable configuration for controlling the condition thereof.

A complete understanding of the present invention and of the above and other features and advantages thereof may be gained from a consideration of the following detailed description of an illustrative embodiment thereof presented hereinbelow in connection with the accompanying drawing, in which:

FIGS. 1A and 2A each symbolically depict a negative resistance diode;

Figure 3A:
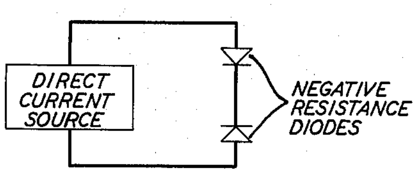
FIG. 3A shows the diodes of FIGS. 1A and 2A connected in series-opposition in a circuit arrangement including a direct-current source.
Figure 3B:
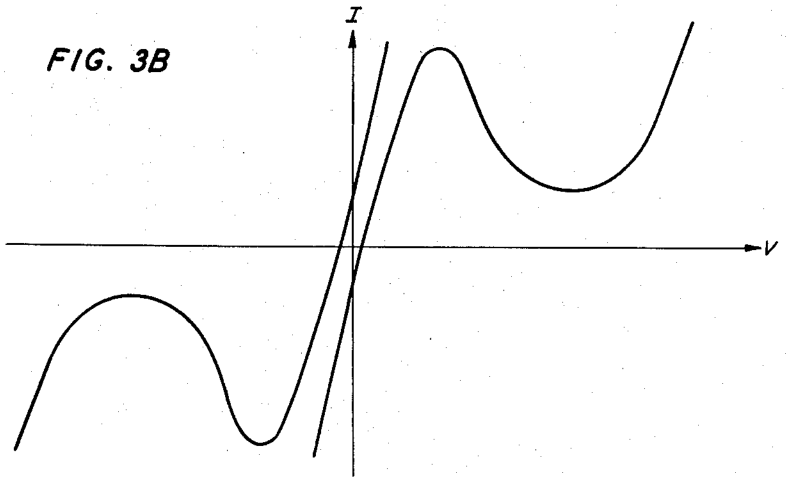
Figure 4A:
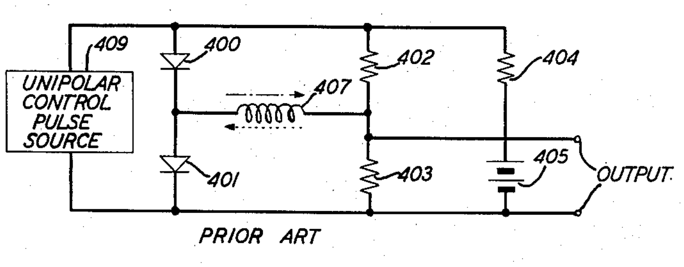
Figure 4B:
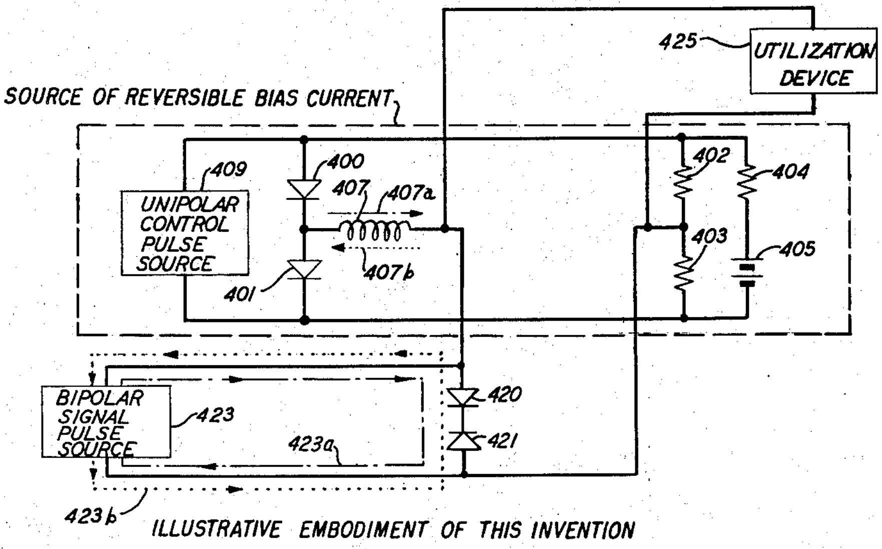
Figure 5A:
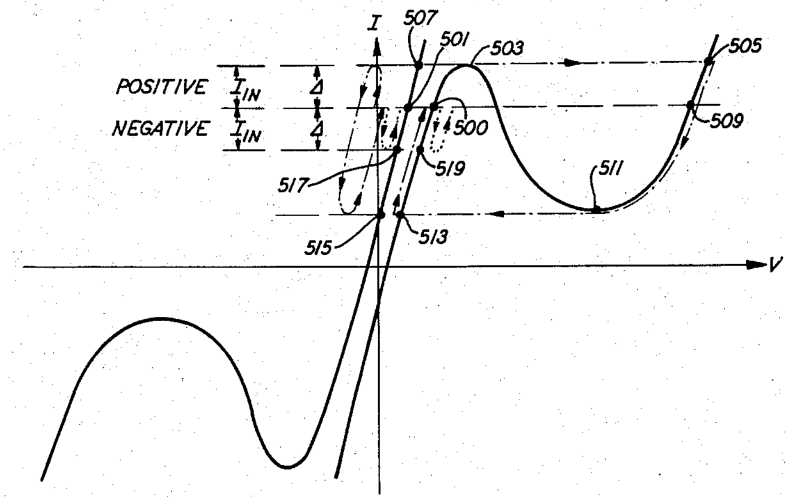
Figure 5B:
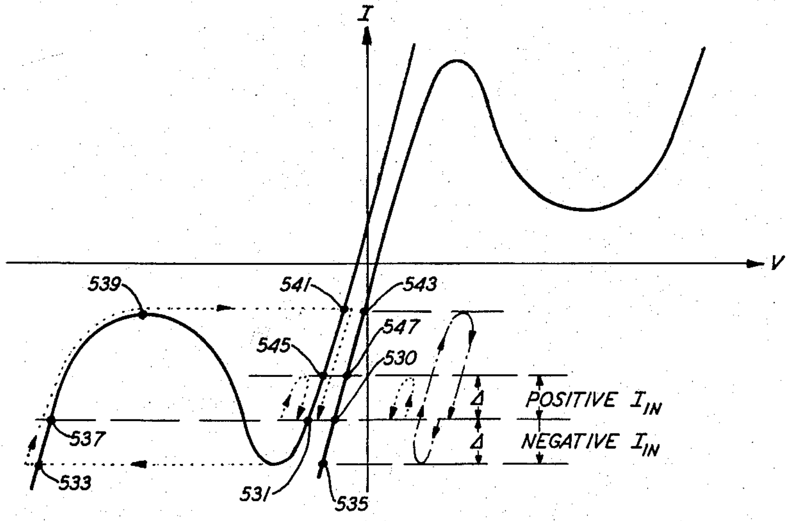
Figure 5C:
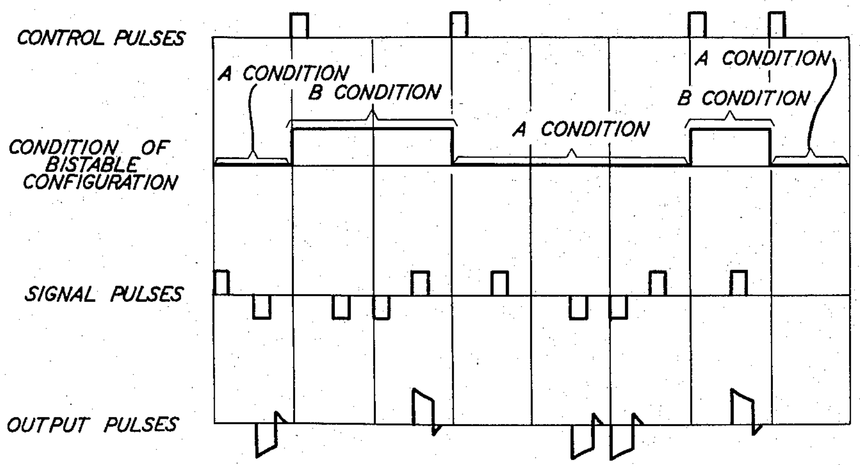

FIG. 3B approximates on a single set of axes the individual voltage-current characteristic curves of the two series-opposed diodes of FIG. 3A;

FIG. 4A depicts a known bistable circuit arrangement;

FIG. 4B is a schematic showing of a specific illustrative embodiment of the principles of the present invention;

FIG. 5A approximates on a single set of axes the individual voltage-current characteristic curves for the two series-opposed diodes shown in the illustrative embodiment of FIG. 4B and, further, indicates the type of diode switching action that takes place in the embodiment of FIG. 4B in response to positive and negative signal pulses when the bistable configuration of the embodiment is in one of its two stable conditions;

FIG. 5B approximates on a single set of axes the individual voltage-current characteristic curves for the two series-opposed diodes of the illustrative embodiment of FIG. 4B and, further indicates the type of diode switching action that takes place in the embodiment of FIG. 4B in response to positive and negative signal pulses when the bistable configuration of the embodiment is in the other of its two stable conditions; and FIG. 5C shows a number of waveforms characteristic of the illustrative embodiment of FIG. 4B.

A great variety of electronic devices and circuits exhibit negative resistance characteristics and it has long been known that such negative resistance characteristics may have one of two forms. The N-type negative resistance, which is referred to as open-circuit stable (or short-circuit unstable, or current-controlled) is characterized by zero-resistance turning points. The S-type negative resistance, which is referred to as short-circuit stable (or open-circuit unstable, or voltage-controlled) is the dual of the N-type and is characterized by zero-conductance turning points. The thyratron and dynatron are vacuum tube examples of devices which respectively exhibit N- and S-type negative resistance characteristics.

Illustrative embodiments of the principles of the present invention include negative resistance diodes of the voltage-controlled type. One highly advantageous example of this type of two-terminal negative resistance arrangement is the so-called tunnel diode. Tunnel diodes are described in the literature: see, for example, "New Phenomenon in Narrow Germanium P-N Junctions," L. Esaki, Physical Review, volume 109, January–March 1958, pages 603–604, and "Tunnel Diodes as High-Frequency Devices," H. S. Sommers, Jr., Proceedings of the Institute of Radio Engineers, volume 47, July 1959, pages 1201–1206.

The tunnel diode comprises a p-n junction having an electrode connected to each region thereof, and is similar in construction to other semiconductor diodes used for such various purposes as rectification, mixing, and switching. The tunnel diode, however, requires two unique characteristics of its p-n junction: that it be narrow (the chemical transition from n-type to p-type region must be abrupt), of the order of 100 Angstrom units in thickness, and that both regions be degenerate (i.e., contain very large impurity concentrations, of the order of $10^{19}$ per cubic centimeter).

The tunnel diode offers more physical and electrical advantages over other two-terminal negative resistance arrangements. These advantages include: potentially low cost, environmental ruggedness, reliability, low power dissipation, high frequency capability, and low noise properties. Advantageously, then, the negative resistance diodes included in illustrative embodiments of the principles of the present invention are tunnel diodes.

Figure 1A:
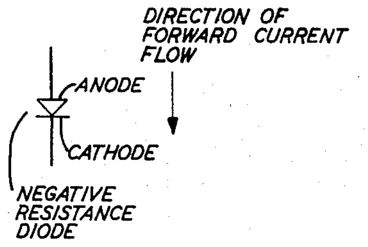
FIGS. 1B and 2B illustrate the voltage-current characteristic curves of the diodes of FIGS. 1A and 2A, respectively.

Referring now to FIG. 1A, there is shown the symbol that will be employed herein to represent a negative resistance diode of the voltage-controlled type. Also, there is shown a downwardly-extending arrow indicating the direction of forward current flow through the diode.

Figure 1B:
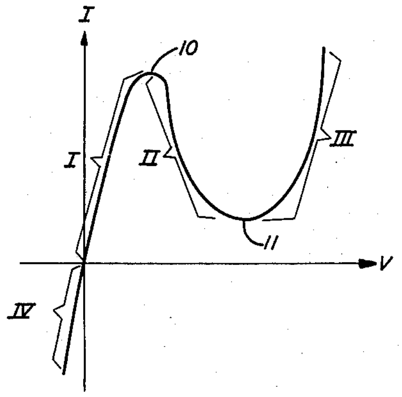

FIG. 1B, which is a graphical depiction of the relationship between the current through and the voltage across the diode of FIG. 1A, includes in the first quadrant or forward current portion thereof a first positive region I, a negative resistance region II, and a second positive resistance region III.

The third quadrant or reverse current portion of the voltage-current characteristic of FIG. 1B includes therein another positive resistance region IV whose resistance value is typically approximately the same as the value of the forward resistance over the regions I and III. In other words, the back or reverse resistance of the diode of FIG. 1A is about the same as the forward resistance thereof. Accordingly, unlike conventional asymmetrically-conducting diodes which have a high front-to-back resistance ratio, such a diode presents a relatively low resistance to current flow in the reverse direction. To current flow in the forward direction, such a diode is represented by an N-type characteristic, as shown in the first quadrant of FIG. 1B.

Figure 2A:
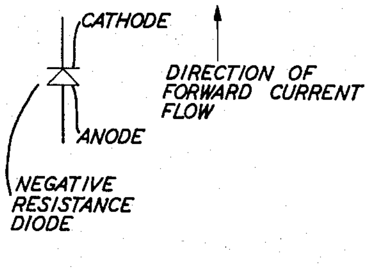

FIG. 2A shows a negative resistance diode of the voltage-controlled type whose symbolic depiction is poled in opposition to the diode illustrated in FIG. 1A. Hence, the direction of forward current flow through the diode of FIG. 2A is opposite to the direction indicated in FIG. 1A, this opposite direction being indicated in FIG. 2A by an upwardly-extending arrow.

Figure 2B:
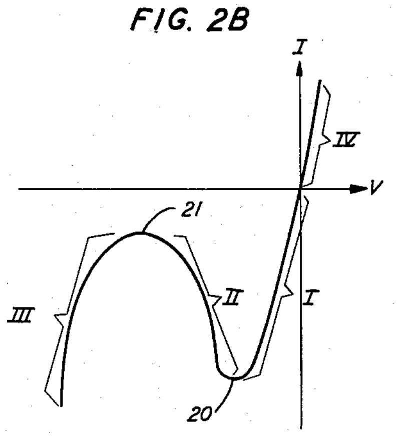

If the principles employed in forming the graphical depiction of FIG. 1B, viz., downward current shown in the first quadrant and upward current shown in the third quadrant, are also applied to the formation of the voltage-current characteristic of the diode of FIG. 2A, the plot shown in FIG. 2B results. The regions of the plot of FIG. 2B which correspond to the regions I, II, III, and IV of FIG. 1B are correspondingly identified in FIG. 2B. Further, the peak and valley points of FIG. 2B are denoted 20 and 21, respectively.

FIG. 3A is included herein simply to provide a basis for an understanding of the type of graphical depiction shown in FIG. 3B. FIG. 3A illustrates an arrangement in which two series-opposed negative resistance diodes of the voltage-controlled type are connected in circuit with a direct-current source. The individual characteristics of the two diodes of FIG. 3A are plotted in FIG. 3B on a single set of axes. In fact, each of the characteristics shown in FIG. 3B should extend through the intersection of the axes. However, to avoid partially overlapping one characteristic on the other, and thereby to more clearly present the principles of this invention, each of the characteristics has been displaced slightly from the intersection. This displacement technique is also employed in the plots of FIGS. 5A and 5B.

FIG. 4A depicts a bistable configuration which is substantially identical to the one shown in FIG. 5 of J. G. Kreer, Jr. Patent 2,614,140, issued October 14, 1952. The configuration of FIG. 4A includes two series-aiding voltage-controlled negative resistance diodes 400 and 401, resistors 402, 403, and 404, a direct-current source 405, and inductor 407, and a unipolar control pulse source 409.

The output of the configuration shown in FIG. 4A is derived from the resistor 403 and is a relatively high or a relatively low voltage level depending respectively on whether the bistable configuration is in one or the other of its two stable conditions. Switching between the two stable conditions is under the control of the source 409.

The arrangement and operation of a configuration of the type shown in FIG. 4A are clearly and completely disclosed in the aforeidentified Kreer patent. Briefly, then, the configuration of FIG. 4A is arranged, and operates, as follows: The parameters of the configuration are so chosen that quiescently neither one of the negative resistance diodes 400 and 401 operates in its region of negative resistance, but one diode operates in its forward positive resistance region on one side of the negative resistance region of its voltage-current characteristic and the other diode operates in its forward positive resistance region on the other side of its negative resistance region. In other words, one diode operates at a relatively high current-low voltage point and the other diode operates at a relatively low current-high voltage point. The difference between the high and low current values flows through the inductor 407 and its direction of flow is indicative of the conditions of the diodes 400 and 401. For example, for one stable condition, the diode 400 conducts a relatively high current value and the diode 401 conducts a relatively low current value. The difference between these values flows from left to right through the inductor 407, as indicated in FIG. 4A by a dot-dash arrow, and a relatively high current flows through the output resistor 403, thereby providing thereacross a relatively high voltage.

Because of the energy stored in the magnetic field around the inductor 407 of FIG. 4A, the current conduction through the inductor 407 cannot change instantaneously. Therefore, by means of a pulse supplied from the control source 409, the currents flowing through the diodes 400 and 401 may be increased in a manner such that the difference between the currents flowing therethrough remains substantially unchanged. This current increase causes the current through the diode 400 to increase to a value above that represented by the peak point thereof. As a result, the diode 400 switches to its relatively high voltage positive resistance region, to a point representative of a current which is greater than that flowing through the diode 401. At the termination of the pulse from the source 409, the currents through the diodes 400 and 401 start to decrease uniformly and the diode 401 reaches its current minimum or valley point and switches to the relatively low voltage positive resistance region of its characteristic curve before the diode 400 reaches its current minimum point. In this manner, the diode 401 transfers to its high current-low voltage condition and the diode 400 transfers to its low curernt-high voltage condition. During this interchange action, the current flowing through the inductor 407 decreases to zero and then builds up to a stable value in the reverse direction. This reverse direction of current flow, which results in a relatively low current through and a relatively low voltage across the output resistor 403, is indicated in FIG. 4A by a dotted arrow.

At a later instant of time, when a second positive current pulse is supplied from the the control source 409 of FIG. 4A, the above-described redistribution of potentials with its consequent change in current flow is performed in the reverse direction, thus restoring the circuit to its initial stable condition in which current flows from left to right through the inductor 407.

Turning now to FIG. 4B, there is shown a specific illustrative embodiment of the principles of the present invention. The embodiment includes a bistable configuration of the type shown in FIG. 4A to the center or inductor-containing leg of which have been added two series-opposed voltage-controlled negative resistance diodes 420 and 421. Further, the embodiment includes a bipolar signal pulse source 423 and a utilization device 425 each connected in parallel with the series-opposed diodes 420 and 421.

Assume that in the absence of the application of pulses from the sources 409 and 423, the bistable portion or configuration of the circuit of FIG. 4B is in the stable condition in which current flows from left to right through the inductor 407, as indicated in FIG. 4B by a dot-dash arrow 407*a*. For this assumed condition the quiescent operating points of the diodes 420 and 421 are the points 500 and 501, respectively, of FIG. 5A, the point 500 representing a forward current flow through the diode 420 and the point 501 representing a reverse current flow through the diode 421, these current values being exactly equal. In this condition the sum of the voltages across the diodes 420 and 421, which is also the voltage across the utilization device 425, is relatively small.

It is noted that the major part of the voltage-current characteristic curve of the diode 420 of FIG. 4B falls in the first quadrants of FIGS. 5A and 5B, that the major part of the voltage-current characteristic curve of the diode 421 falls in the third quadrants thereof, and that the graphical depictions of FIGS. 5A and 5B have been constructed in accordance with the above-mentioned displacement technique.

Assume now that a positive signal current pulse of an amplitude just exceeding $\Delta$, i.e., just sufficient to raise the operating point 500 of the diode 420 over the peak point 503, is supplied by the bipolar signal pulse source 423. The direction of flow of this current is from the upper side of the source 423 from left to right through the series-opposed diodes 420 and 421 and then to the lower side of the source 423, as indicated in FIG. 4B by a dot-dash line 423*a*. A negligible part of this current flows through the inductor 407 because the inductor possesses the property of current inertia, and a negligible part of this current flows through the utilization device 425 because its resistance is selected to be many times greater than the resistance of the series-opposed diodes 420 and 421.

Accordingly, substantially the entire positive signal current pulse from the source 423 flows from left to right through the series-opposed diodes 420 and 421, thereby, as indicated in FIG. 5A by dot-dash lines, causing the operating point of the diode 420 to switch from the quiescent point 500 to the point 505 and causing the operating point of the diode 421 to shift from the quiescent point 501 to the point 507. Then, as the positive signal current pulse returns to a zero level, the operating point of the diode 420 shifts from the point 505 to the point 509 which represents the same current value as the quiescent point 501, and the operating point of the diode 421 returns to the quiescent point 501.

Thereafter, due to the collapse of the magnetic field about the inductor 407 of FIG. 4B, the operating point of the diode 420 charges toward the valley point 511, switches to the point 513 and then charges back to the quiescent point 500. During the time in which the operating point of diode 420 is moving from the point 509 to the point 511 to the point 513 and back to the quiescent point 500, the operating point of the diode 421 shifts to the point 515 and then back to the quiescent point 501.

As can be clearly seen from FIG. 5A, the voltage excursion of the switched diode 420 in response to a positive signal pulse is greater than that of the unswitched diode 421. As a result, a relatively large positive voltage pulse appears at the output, i.e., across the utilization device 425, of the circuit of FIG. 4B. The width of this output pulse is mainly dependent upon the value of the inductor 407, the values of the resistors 402 and 403, and the quiescent current through the inductor 407. This width is typically greater than the width of an input pulse, and is largely independent of variations in the width of input pulses.

Assume now, the bistable configuration of the circuit of FIG. 4B still being in the stable condition assumed above in which current flows from left to right through the inductor 407, that a negative signal current pulse of an amplitude just exceeding Δ is supplied by the bipolar signal pulse source 423. For the reasons given above, a negligible part of this current flows through the inductor 407 and the device 425. Accordingly, substantially the entire negative signal current pulse from the source 423 flows from right to left through the series-opposed diodes 421 and 420, thereby, as indicated in FIG. 5A by dotted lines, causing the operating point of the diode 421 to shift from the quiescent point 501 to the point 517, and causing the operating point of the diode 420 to shift in synchronism therewith from the quiescent point 500 to the point 519. Then, as the negative signal current pulse returns to a zero level, the operating point of the diode 421 returns to the quiescent point 501, and the operating point of the diode 420 returns in synchronism therewith to the quiescent point 500.

Thus, for the assumed or first stable condition of the bistable configuration of the circuit of FIG. 4B, neither one of the diodes 420 and 421 switches in a monostable manner in response to a negative signal current pulse. Instead, the operating point of each diode simply shifts from the quiescent point on the selected one of the positive resistance regions of its voltage-current characteristic to a point on the selected region representative of a slightly less positive voltage. As a result, the change in voltage across the series-opposed diodes, and, therefore, across the utilization device 425, is relatively small, typically about 100 millivolts, and will, as a practical matter, be disregarded hereinafter.

To summarize so far: with the bistable configuration of the circuit of FIG. 4B in its first stable condition, the monostable configuration including the series-opposed diodes 420 and 421 responds to a positive signal pulse from the source 423 to supply an amplified positive output pulse of a predetermined width to the utilization circuit 425. On the other hand, with the bistable configuration in its first stable condition, the voltage across the series-opposed diodes 420 and 421, and, therefore, across the utilization device 425, does not change appreciably in response to a negative signal pulse from the source 423.

Assume now that the bistable configuration of the circuit of FIG. 4B is switched to its other or second stable condition by means of a control pulse from the source 409. In this second stable condition current flows from right to left through the inductor 407, as indicated in FIG. 4B by a dotted arrow 407*b*, and the quiescent operating points of the diodes 420 and 421 are the points 530 and 531, respectively, of FIG. 5B, the point 530 representing a reverse current flow through the diode 420 and the point 531 representing a forward current flow through the diode 421, these current values being exactly equal.

Assume that a negative signal current pulse of an amplitude just exceeding Δ is supplied by the bipolar signal pulse source 423 of FIG. 4B. The direction of flow of this current is from the lower side of the source 423 from right to left through the series-opposed diodes 421 and 420 and then to the upper side of the source 423, as indicated in FIG. 4B by a dotted line 423*b*. For the reasons specified above, a negligible part of this current flows through the inductor 407 and the utilization device 425. Accordingly, substantially the entire negative signal current pulse from the source 423 flows from right to left through the series-opposed diodes 421 and 420, thereby, as indicated in FIG. 5B by dotted lines, causing the operating point of the diode 421 to switch from the quiescent point 531 to the point 533 and causing the operating point of the diode 420 to shift from the quiescent point 530 to the point 535. Then, as the negative signal current pulse returns to a zero level, the operating point of the diode 421 shifts from the point 533 to the point 537 which represents the same current value as the quiescent point 531, and the operating point of the diode 420 returns to the quiescent point 530.

Thereafter, due to the collapse of the magnetic field about the inductor 407 of FIG. 4B, the operating point of the diode 421 charges toward the valley point 539, switches to the point 541 and then charges back to the quiescent point 531. During the time in which the operating point of the diode 421 is moving from the point 537 to the point 539 to the point 541 and back to the quiescent point 531, the operating point of the diode 420 shifts to the point 543 and then back to the quiescent point 530.

As can be clearly seen from FIG. 5B, the voltage excursion of the switched diode 421 in response to a negative signal current pulse is greater than that of the unswitched diode 420. As a result, a relatively large negative voltage pulse appears at the output, i.e., across the utilization device 425, of the circuit of FIG. 4B.

Assume now, the bistable configuration of the circuit of FIG. 4B still being in the second stable condition in which current flows from right to left through the inductor 407, that a positive signal current pulse of an amplitude just exceeding Δ is supplied by the bipolar signal pulse scource 423. For the reasons given above, a negligible part of this current flows through the inductor 407 and the utilization device 425. Accordingly, substantially the entire positive current pulse from the source 423 flows from right to left through the series-opposed diodes 421 and 420, thereby, as indicated in FIG. 5B by dot-dash lines, causing the operating point of the diode 421 to shift from the quiescent point 531 to the point 545 and causing the operating point of the diode 420 to shift in synchronism therewith from the quiescent point 530 to the point 547. Then, as the positive signal current pulse returns to a zero level, the operating point of the diode 421 returns to the quiescent point 531 and the operating point of the diode 420 returns in synchronism therewith to the quiescent point 530.

Thus, in the second stable condition of the bistable configuration of the circuit of FIG. 4B, neither one of the diodes 420 and 421 switches in response to a positive signal current pulse from the source 423. Instead, the operating point of each diode simply shifts from the quiescent point on the selected one of the positive resistance regions of its voltage-current characteristic to another point on the selected region representative of a slightly more positive voltage. As a result, the change in voltage across the series-opposed diodes, and, therefore, across the utilization device 425, is relatively small, typically about 100 millivolts, and will, as a practical matter, be disregarded herein.

FIG. 5C graphically depicts the capabilities of the illustrative embodiment shown in FIG. 4B and described above. As shown in FIG. 5C, each application of a control pulse from the source 409 causes the condition of the bistable configuration of the circuit of FIG. 4B to change. Further, FIG. 5C indicates that when the bistable configuration is in the condition marked A, only negative signal pulses from the source 423 are effective to provide amplified output pulses of a predetermined width, and that when the bistable configuration is in its B condition, only positive signal pulses are effective to provide such output pulses. In each case, the polarity of the output pulse corresponds to that of its associated signal pulse.

The return of the two diodes 420 and 421 to their quiescent operating points following a regenerative switching cycle is easily insured by selecting the parameters of the circuit of FIG. 4B such that, for the undesired case in which the switched diode tends to remain on the relatively high voltage positive resistance region to which it had been switched, the current through the inductor 407 would decrease to zero. Such a current decrease is inconsistent with the maintenance of the switched diode on its relatively high voltage positive resistance region and, therefore, causes the switched diode to revert to its quiescent operating point.

It is significant that the selective regenerative switching action which the tunnel diodes 420 and 421 of the illustrative circuit of FIG. 4B undergo cannot possibly cause the condition of the bistable configuration to change. For example, a current flow from left to right through the inductor 407 of FIG. 4B is a result of the diode 401 of the bistable configuration being in a relatively high voltage-low current condition. In this condition, only a positive signal pulse from the source 423 will trigger the tunnel diodes 420 and 421 to supply regenerative gain, as clearly shown in FIG. 5A. Following the removal of such a positive signal pulse, the regenerative switching action causes the current through the diodes 420 and 421 to decrease from the current value represented by the quiescent operating points 500 and 501, which requires that the current through the diode 401 increase. This current increase simply causes the operating point of the diode 401 to move to a higher voltage-higher current point on region III of its characteristic curve and clearly does not tend to move its operating point toward the valley point of its characteristic curve. This clearly-avoided latter tendency is, of course, highly undesirable because it might cause the diode 401 to switch to its relatively low voltage-high current condition, thereby changing the condition of the bistable configuration at a time when it was not desired to do so.

One illustrative set of values for the components of the circuit shown in FIG. 4B is as follows: negative resistance diodes 400 and 401—germanium tunnel diodes, 20 milliamperes peak current; negative resistance diodes 420 and 421—germanium tunnel diodes, 8 milliamperes peak current; inductor 407, 20 microhenries; resistors 402 and 403, each 47 ohms; resistance of bipolar signal pulse source 423, 100 ohms; and resistance of utilization device 425, 100 ohms.

It is emphasized that although particular attention herein has been directed to the use of tunnel diodes as the components 400, 401, 420, and 421 of the circuit of FIG. 4B, other two-terminal voltage-controlled negative resistance arrangements having characteristics of the general type shown in FIGS. 1B and 2B may also be used therefor.

It is noted that my copending application Serial No. 28,402, filed May 11, 1960 is directed to subject matter which is closely related to the second bistable configuration of the circuit disclosed herein.

It is to be understood that the above-described arrangements are only illustrative of the application of the principles of the present invention. Numerous other arrangements may be devised by those skilled in the art without departing from the spirit and scope of this invention. For example, the series-opposed diodes 420 and 421 may, alternatively, have their plates (instead of their cathodes) connected together. Also, other bistable configurations of the type comprising an inductor-containing path in which the direction of current flow is respectively dependent on the condition of the bistable configuration are suitable for inclusion in combinations embodying the principles of the present invention.

What is claimed is:

1. In combination in a bipolar bistable selective regenerative amplifying circuit, two voltage-controlled negative resistance diodes connected in series-aiding, two series-connected resistance elements, direct-current source means connected in parallel with said series-aiding diodes and with said series-connected resistance elements, control pulse means connected in parallel with said series-aiding diodes, a circuit path interconnecting the junction of said series-aiding diodes and the junction of said series-connected resistance elements, said circuit path including two voltage-controlled negative resistance diodes connected in series-opposition and an inductor connected in series therewith, and bipolar signal pulse means and output means each connected in parallel with said series-opposed diodes.

2. In combination in a bipolar bistable selective regenerative amplifying circuit, a bistable circuit configuration including a current-carrying electrical path having therein an inductor, the direction of current flow through said inductor being respectively dependent on the condition of said bistable circuit configuration, control pulse source means for switching said bistable circuit configuration between its two stable conditions and thereby controlling the direction of current flow through said inductor, two series-opposed voltage-controlled negative resistance diodes connected in series with said inductor, bipolar signal pulse source means connected in parallel with said series-opposed diodes, and output means responsive to the voltage across said series-opposed diodes.

3. In combination, in a bipolar bistable selective regenerative amplifying circuit, two voltage-controlled negative resistance diodes connected in series-opposition, means for controlling the direction of current flow through said series-opposed diodes, signal source means for supplying a positive pulse to said series-opposed diodes when the direction of current flow therethrough is in a first direction to switch only one of said series-opposed diodes in a monostable manner, and for supplying a negative pulse to said series-opposed diodes when the direction of current flow therethrough is in the second direction to switch only the other one of said series-opposed diodes in a monostable manner, and output means responsive to the condition of said series-opposed diodes.

4. A bipolar bistable selective regenerative amplifying circuit comprising a bistable circuit configuration including an inductor, means for controlling the direction of current flow through said inductor, and a circuit configuration including two series-opposed negative resistance diodes connected in series with said inductor.

5. A circuit as in claim 4 further including bipolar signal pulse source means and output means each connected in parallel with said series-opposed diodes.

6. In combination, first bistable means, including an inductor, for supplying a current to said inductor in a first and second polarity, and second bistable means serially connected to said inductor and responsive to a current supplied by said first bistable means flowing therethrough in said first and second polarity for residing in a first and second stable state, respectively.

7. A combination as in claim 6 further including pulse means for controlling the condition of said first bistable circuit configuration.

8. In combination, a first bistable configuration including an inductor, a second bistable configuration serially connected to said inductor, the direction of current flow through said series connection being dependent upon the condition of said first bistable configuration, and the state of said second bistable configuration being dependent on the direction of said current flow therethrough, and pulse means for controlling the condition of said first bistable circuit configuration, said second bistable configuration including two series-opposed negative resistance diodes connected in series with said inductor.

9. A combination as in claim 8 further including bipolar signal pulse source means connected in parallel with said series-opposed diodes, and output means responsive to the voltage across said series-opposed diodes.

10. In combination, a bistable circuit configuration including an inductor, unipolar pulse means for controlling the condition of said bistable circuit configuration, the current flow through said inductor being in one direction for one stable condition of said bistable circuit configuration and in the opposite direction for the other stable condition thereof, and a bistable circuit configuration including two series-opposed tunnel diodes connected in series with said inductor.

11. A combination as in claim 10 further including signal source means for causing one of said series-opposed diodes to switch in a monostable manner when the bistable circuit configuration is in one of its stable conditions and for causing the other one of said series-opposed diodes to switch in a monostable manner when the bistable circuit configuration is in the other one of its stable conditions, and output means responsive to the voltage across said series-opposed diodes.

References Cited in the file of this patent

UNITED STATES PATENTS

| | | |
|---|---|---|
| 2,614,141 | Edson | Oct. 14, 1952 |
| 2,614,142 | Edson | Oct. 14, 1952 |
| 2,816,237 | Hageman | Dec. 10, 1957 |
| 2,838,675 | Wanlass | June 10, 1958 |
| 2,944,164 | Odell et al. | July 5, 1960 |